United States Patent [19]

Epema et al.

[11] Patent Number: 5,207,024
[45] Date of Patent: May 4, 1993

[54] DOOR SYSTEM OF THE SWIVEL-SLIDING TYPE FOR USE IN AN VEHICLE

[75] Inventors: Sietse Epema, Wassenberghstraat; Bart van der Sloot, Skildijk; Jelle Hooghiem, Veltmanwei, all of Netherlands

[73] Assignee: Tebel Pneumatiek B.V., Leeuwarden, Netherlands

[21] Appl. No.: 815,075

[22] Filed: Dec. 27, 1991

[30] Foreign Application Priority Data

Dec. 28, 1990 [NL] Netherlands ............ 9002885

[51] Int. Cl.⁵ ............................................. E05F 11/00
[52] U.S. Cl. .............................. 49/360; 49/210; 49/130
[58] Field of Search ............ 49/118, 130, 210, 216, 49/217, 218, 324, 360

[56] References Cited

U.S. PATENT DOCUMENTS

| | | | |
|---|---|---|---|
| 1,173,113 | 2/1916 | Lackey | 49/324 |
| 1,838,878 | 12/1931 | Stoddard | 49/324 |
| 2,552,356 | 5/1951 | Weigele | 49/210 |
| 3,439,451 | 4/1969 | Jung | 49/360 |
| 3,802,126 | 4/1974 | Markus | 49/360 |
| 4,087,939 | 5/1978 | Elguindy et al. | 49/118 |
| 4,503,637 | 3/1985 | Parente | 49/360 |
| 4,735,292 | 4/1988 | Munz | 49/360 |
| 4,882,876 | 11/1989 | Daugirdas | 49/118 |
| 4,964,228 | 10/1990 | Coffman | 49/360 |

FOREIGN PATENT DOCUMENTS

| | | |
|---|---|---|
| 0259568 | 3/1988 | European Pat. Off. . |
| 1906629 | 8/1970 | Fed. Rep. of Germany ........ 49/360 |
| 2133309 | 11/1972 | France . |
| 2335679 | 7/1977 | France . |
| 8201964 | 12/1983 | Netherlands . |
| 8802246 | 9/1988 | Netherlands . |

Primary Examiner—Renee S. Luebke
Assistant Examiner—Michael Milano
Attorney, Agent, or Firm—Merchant, Gould, Smith, Edell, Welter & Schmidt

[57] ABSTRACT

A door system of the swivel-sliding type for use in a vehicle, suitable in particular for a vehicle for public transport, the door system comprising at least one door panel; suspension means for the at least one door panel, which comprise a telescopic guide; and a drive system for the at least one door panel, wherein the drive system comprises at least one piston-cylinder assembly of which a first movable part is connected to the telescopic guide via a system of arms and rods so as to cause the telescopic guide in operation to perform a plugging movement, while a second part of the piston-cylinder assembly is provided with a projection extending into a track having a first section extending substantially transverse to the at least one door panel and an adjoining section extending substantially parallel to the telescopic guide, the projection forming a part of a pantograph construction mounted between a fixed pivot point and a point of attachment on the door panel, said pantograph construction transmitting the movement of the projection to the door.

38 Claims, 4 Drawing Sheets

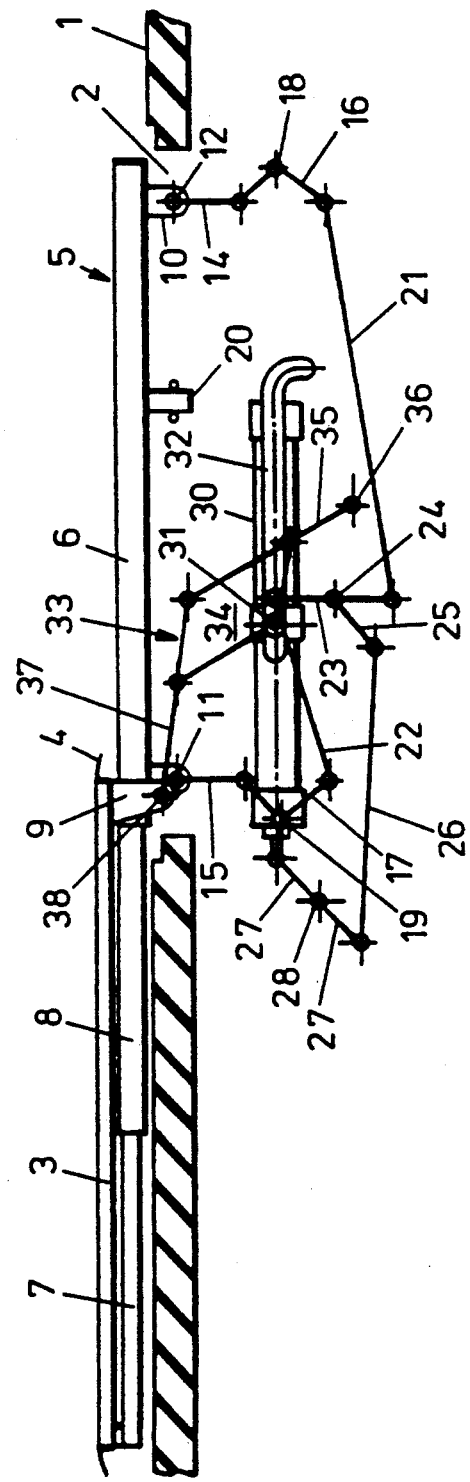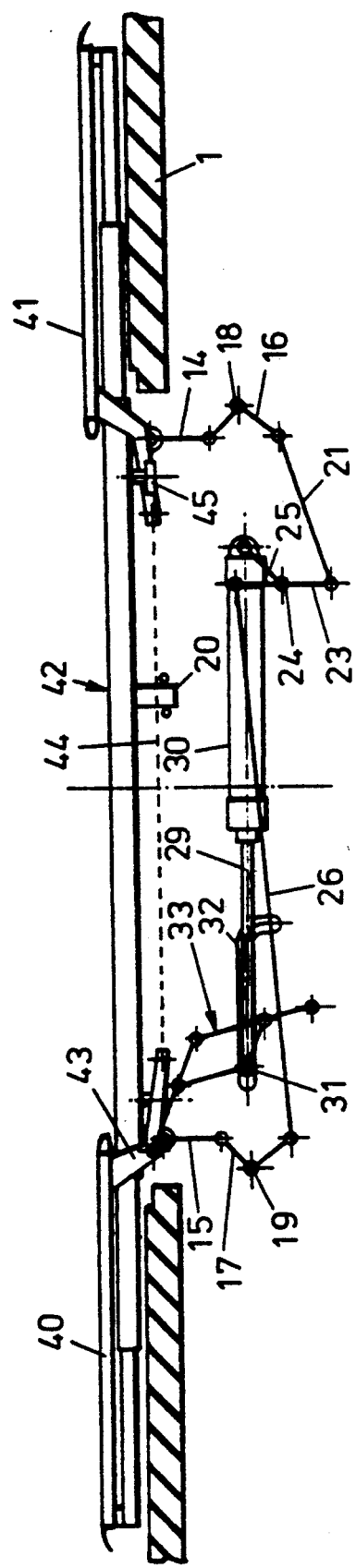

DOOR SYSTEM OF THE SWIVEL-SLIDING TYPE FOR USE IN AN VEHICLE

This invention relates to a door system of the swivel-sliding type for use in a vehicle, suitable in particular for a vehicle for public transport, said door system comprising at least one door panel; suspension means for said at least one door panel, which comprise a telescopic guide; and a drive system for said at least one door panel.

Swivel-sliding doors are doors which in a first phase of movement are moved from the closed position to a position outside the door opening and in a second phase of movement slide further along the wall of the vehicle into the opened position.

An advantage of swivel-sliding doors is that the sliding movement performed by such doors permits the use of relatively wide doors. If such doors are used in vehicles for public transportation, they lead to short get-in/get-off intervals.

A door system of the type described above is disclosed in NL patent application Ser. No. 8802246.

The object of the invention is to provide a door system of the type described above, which is of simpler construction than the known door system, may therefore be lighter and is relatively little susceptible to failure. Generally, the object of the invention is to provide an improved door system that operates reliably and is yet of relatively simple construction.

To that end, according to the invention, a door system of the type described is characterized in that the drive system comprises at least one piston-cylinder assembly of which a first movable part is connected to the telescopic guide via a system of arms and rods so as to cause said telescopic guide in operation to perform a plugging movement, while a second part of the piston-cylinder assembly is provided with a projection extending into a track having a first section extending substantially transverse to said at least one door panel and an adjoining section extending substantially parallel to the telescopic guide, the projection forming a part of a pantograph construction mounted between a fixed pivot point and a point of attachment on said door panel, said pantograph construction transmitting the movement of the projection to the door.

In the following, the invention will be further described, by way of example, with reference to the accompanying drawings of some embodiments. In said drawings:

FIG. 3 is a schematic view of the system of FIGS. 1 and 2, in which the door panel has slid into the open position;

FIGS. 4-6 are schematic top plan views similar to FIGS. 1-3, of a second embodiment of a door system according to the invention, comprising two door panels;

Figure 1:
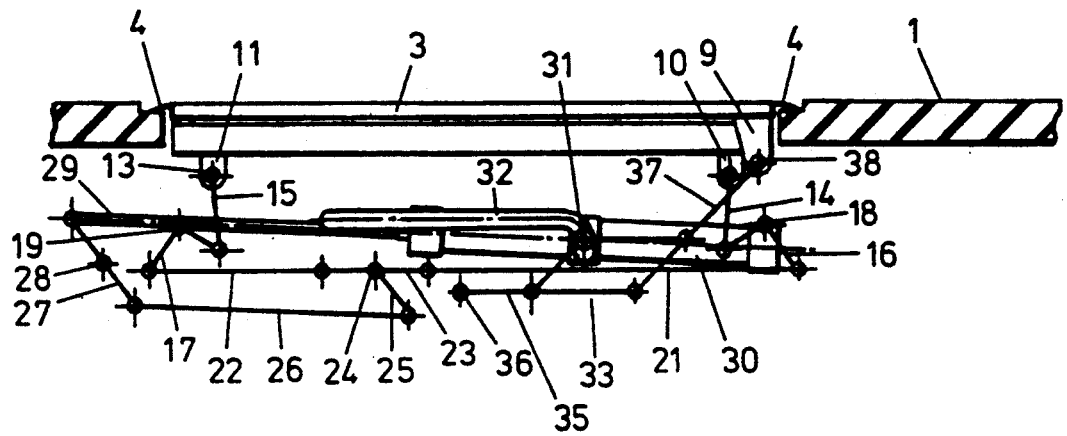
FIG. 1 is a schematic top plan view of an embodiment of a door system according to the invention comprising a single door panel in the closed position.
Figure 2:
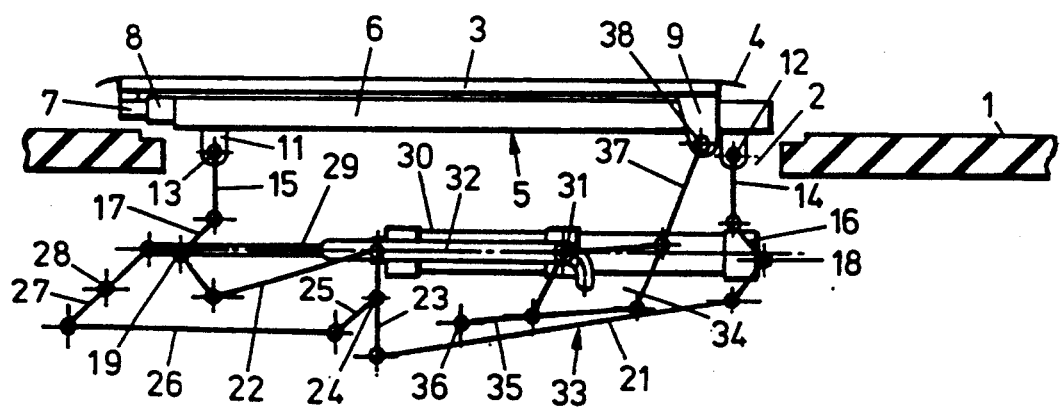
FIG. 2 is a schematic view of the system of FIG. 1, in which the door panel has been pushed outwards.

FIGS. 1-3 show a wall 1, for instance a wall of a vehicle, comprising a door opening 2 which can be closed or cleared by means of a door panel 3. The door panel 3 is suspended from a telescopic guide 5 positioned adjacent the top of the door opening 2, the guide 5 extending substantially parallel to the wall 1 in substantially horizontal position. In the conventional manner, the door panel has been fitted with supple edge strips schematically shown at 4, which abut the edges of the door opening in the closed position of the door.

As can be seen in FIGS. 2 and 3, the telescopic guide 5 in this embodiment comprises an outer element 6; an inner element 7 and an intermediate element 8. In the conventional manner, adjacent one edge thereof the door panel is connected to the inner element 7 and is further adapted to slide or roll over the outer element by means of a guide 9. In the embodiment shown, the guide serves also as a member of engagement for the drive system, but, if so desired, other suitable means can equally be used for this purpose.

Adjacent each of its ends, the outer element of the telescopic guide is pivotally connected to a pull/push arm providing for the so-called plugging movement. This plugging movement is a door panel movement occurring substantially perpendicularly to the plane of the door opening, by which movement the door panel is pulled into or pushed out of the door opening. In the example shown, adjacent each of its ends the outer element of the telescopic guide is fitted with a lug 10, 11 having a pull/push arm 14, 15 connected thereto. Further, as schematically indicated in FIG. 3, at least one guiding member 20 is provided, which ensures that the telescopic guide can only move perpendicularly to the door opening. The arms 14, 15 each have their end remote from the associated lug 10, 11 pivotally connected to a bent second arm 16, 17, respectively, adapted to pivot about a vertical pin at a fixed pivot point 18, 19, respectively. The ends of the arms 16, 17 located beyond the pivot points 18, 19 are each pivotally connected to a coupling rod 21, 22. The coupling rods in turn are each pivotally connected to one of the ends of a balance lever 23 having a fixed pivot point 24. and comprising an operating arm 25 mounted at the fixed pivot point 24. Via a connecting rod 26 and a lever 27 having a fixed pivot point 28, the free end of the operating arm 25 is pivotally connected to one end, i.e. to the piston rod 29 in this example, of a double-acting hydraulic or pneumatic cylinder 30. The cylinder comprises a projection 31 running in a substantially L-shaped track 32. The track 32 comprises a first relatively long straight section extending substantially parallel to the telescopic guide and a relatively short bent section, the free end of which extends substantially transversely to the plane of the guide for opening the door.

The projection 31 further constitutes one angular point of a pantograph construction 33 comprising a deformable rod parallelogram 34. Of the rods of the parallelogram that are disposed opposite the projection 31, one rod 35 is extended and pivotally mounted at a fixed pivot point 36, while the other rod 37, connecting to the first rod, is likewise extended and is pivotally connected to the door panel 3. In the example shown, rod 37 is pivotally mounted on the guide member 9 at 38.

The operation of the apparatus as described is as follows. In the fully closed position of the door panel 3 as shown in FIG. 1, the projection 31 is disposed at the end of the bent section of the track 32 and the piston rod 29 of the cylinder 30 is disposed in the extreme position. In that position, the coupling rods 21, 22 and the balance lever 23 are substantially in one line and the telescopic guide with the door panel is pulled into the rebate of the door opening via the bent arms 16, 17 and the pull/push arms 14, 15. In a practical embodiment, preferably use is made of the over-centre closing principle, which is known as such, in accordance with which the balance lever is pivoted slightly beyond the dead-centre position shown in FIG. 1. Thus, the door panel is at all times prevented from opening as a result of forces, such as suction forces, being exerted directly onto it.

To open the door panel, the cylinder 30 is energized in such a way that the piston rod is retracted. The cylinder is retained by the projection 31 disposed in the bent section of the track 32, extending perpendicularly to the longitudinal direction of the piston rod. Via the lever 27, the connecting rod 26 and the operating arm 25, the balance lever 23 is now turned clockwise. Simultaneously, via the rods and arms 14, 16, 21 and 15, 17, 22, respectively, the telescopic guide 6 is pushed outwards perpendicularly to the plane of the door opening, as indicated in FIG. 2, the door panel 3 being carried along.

During this outward "unplugging" movement, the arm 37 of the pantograph construction is also pulled along, with the result that the projection 31 moves in track 32 up to the beginning of the relatively long straight section.

The balance lever 23 is now in a position transverse to the plane of the door opening and cannot turn any further. For this purpose, suitable stops could optionally be provided adjacent the balance lever and/or the lever 27.

Upon further energization of the cylinder, therefore, the cylinder itself moves along the piston rod, whereby projection 31 is guided through the straight section of the track. Via the pantograph construction, this rectilinear movement of the projection 31 is transmitted to an enlarged scale to the pivot point 38 where the pantograph arm 37 is connected to the door 3, so that the door panel slides along the wall 1, thereby clearing the door opening while the elements 7 and 8 of the telescopic guide 5 are being extended. The end situation is shown in FIG. 3.

Closure of the door panel occurs in reverse order. The cylinder 30 is energized in the opposite direction and moves along track 32 until the telescopic guide is fully retracted and the door panel is located straight opposite the door opening. At that time, the projection 31 is at the beginning of the bent section. Upon further energization of the cylinder, the piston rod 29 is pushed out, whereby the balance lever is pivoted counterclockwise while via rods and arms 14, 16, 21 and 15, 17, 22, the telescopic guide is pulled towards the wall 1, carrying the door panel along (plugging movement). At the same time, the projection is pushed into the bent section of the track by means of the pantograph construction. The door panel is now disposed in the closed position and the balance lever has pivoted just beyond the dead-centre position.

The lower end of the door panel can be guided, for instance by means of a platform rod comprising an arm having a projection running in a guide mounted on the door panel. An example of such a construction is disclosed in NL patent application Ser. No. 8201964.

It is also possible to provide a rod system at the bottom of the door panel, similar to that provided at the top, with the rod system being driven from the top, for instance. For this purpose, a platform rod could be provided adjacent the pivot point 28. Similar options apply to the embodiment shown in FIGS. 4-6.

Figure 4:
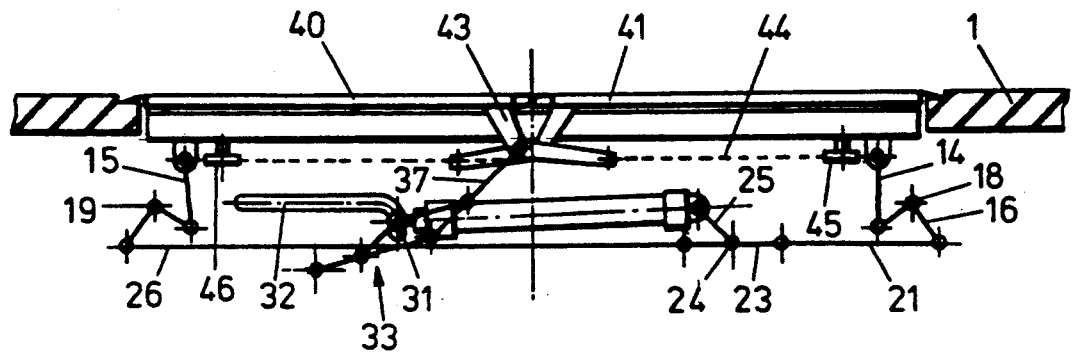
Figure 5:
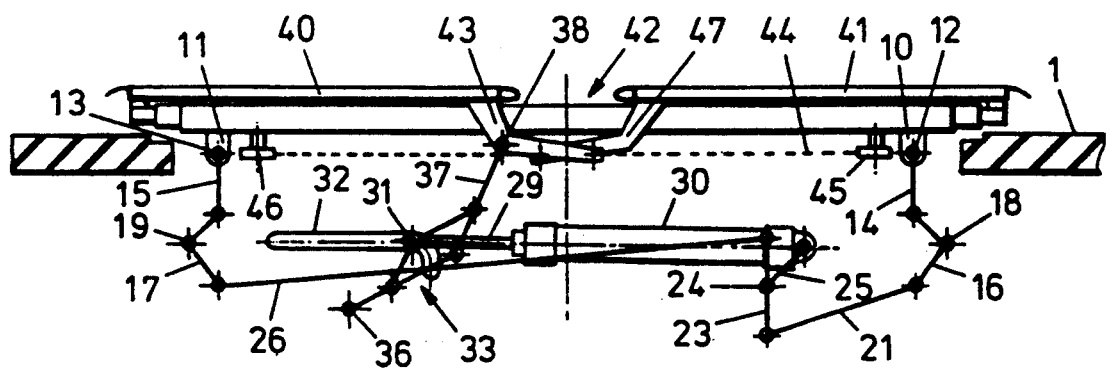

FIGS. 4-6 show a door system according to the invention comprising two door panels 40, 41 and a double-acting telescopic guide 42. Corresponding elements are designated by the same reference characters as in FIGS. 1-3.

The system shown in FIGS. 4-6 comprises a cylinder 30 again, but the piston rod 29 thereof carries the projection 31, while the other end of the cylinder is connected direct to the operating arm 25 of the balance lever 23. In the closed position of the door panels 40, 41, the piston rod 29 is retracted and the projection 31 is again disposed in the bent section of the track 32. The projection is again connected to a pantograph construction 33, which is further connected between a fixed pivot 36 and a point of attachment on one of the door panels (in this example door panel 40). Starting from the closed position shown in FIG. 4, in which the balance lever is preferably just beyond the dead-centre position, the door can be opened by energizing the cylinder. As the piston rod is retained by the projection situated in the bent section of the track, the cylinder itself moves to the right, thereby pivoting the balance lever. Via rods and arms 16, 21 and 15, 26, respectively, the balance lever thereby operates the pull/push arms 14 and 15 which push the double-acting telescopic guide outwards (unplugging movement). Through the pantograph construction, the projection 31 is thereby shifted into a position facing the straight section of the track, so that the piston rod can slide out upon further energization of the cylinder 30. The pantograph construction is connected to the left-hand door panel 40, so that this door panel follows the movement of projection 31 and slides along the wall 1 of the vehicle until the projection 31 has reached the end of the track and/or the telescopic guide is fully extended.

Figure 7:
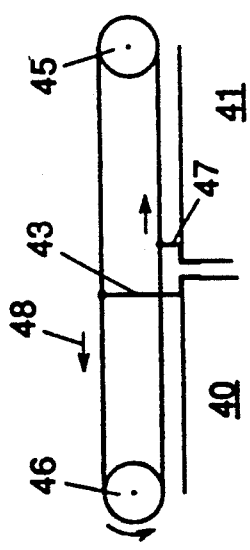
FIG. 7 is a schematic view of the manner in which the two doors of FIGS. 4-6 can be coupled to each other for performing the sliding movement.

The pantograph arm 37 is connected to an arm 43 mounted on the door panel 40, the arm 43 in this embodiment also serving as a guiding member adapted to move along the telescopic guide. In this embodiment, the arm 43 comprises a free end extending beyond the pivot 38, this free end being connected with a rope, belt or chain 44 which has been passed over two wheels or rollers 45, 46. The wheels or rollers 45, 46 are each arranged adjacent one of the ends of the fixed part of the telescopic guide 41. The rope, belt or chain 44 is further connected to a similar arm 47 of the other door panel 41, in such a manner that a door panel 40 sliding to the left will cause the other door panel 41 to slide to the right and vice versa. Accordingly, the door panels slide away from or towards each other simultaneously. For further clarification, all this is once more shown schematically in FIG. 7. FIG. 7 schematically shows the return wheels or rollers 45, 46 over which is passed the belt, rope or chain 44 having its upper section connected to the left-hand door panel 40 through schematically shown arm 43. The right-hand door panel is connected to the lower section of the belt, rope or chain through schematically shown arm 47. When the door panel 40 is moved to the left by the pantograph construction, as indicated by arrow 48, the right-hand door panel is pulled to the right through arm 47. Similarly, when the door panel 40 moves to the right, the door panel 41 accordingly moves to the left.

As noted before, it is also possible to provide a rod system at the bottom of the door panel, similar to that provided at the top, with the rod system being driven from the top. In the embodiment of FIGS. 4-6 comprising two door panels, the bottom could be constructed as in FIGS. 8 and 9.

Figure 8:
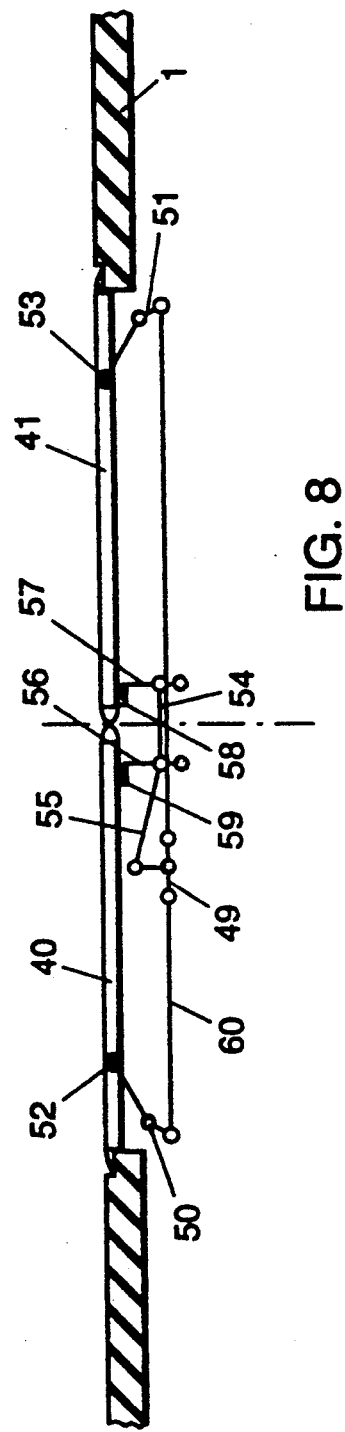
FIGS. 8 and 9 are schematic views of a possible suspension and interlocking arrangement for doors of a door system according to the invention.
Figure 9:
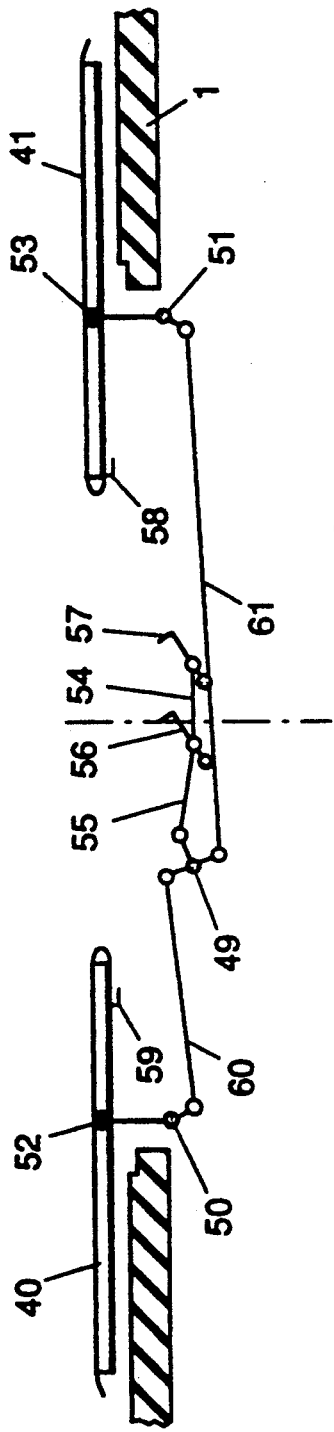

FIGS. 8 and 9 schematically show a door system according to the invention again, comprising two door panels 40, 41 provided with a guide mounted adjacent the lower end of the panels, the guide having a projection 52, 53 running in it.

FIG. 8 shows the situation in the closed position. The balance lever 49 along with the rod system 50, 51, 60, 61 connected thereto is beyond the dead-centre position, thereby keeping the doors closed and latched. Connected to the balance lever is an additional mechanism consisting of a drive rod 55, coupling rod 54 and locks 56, 57 adapted to engage projections 58, 59 provided on the door panels. The purpose of this it to effect a four-point lock for each door panel. Two points of engagement at the top adjacent the ends of the telescope and at the arms 43, 47 and two points at the lower end at the projections 52, 53 and 58, 59 together form eight points of engagement for a system with two door panels. The lower balance lever is driven from the upper balance lever through a rod system or by means of cables.

FIG. 9 shows the situation where the doors are halfway open. The projections 58, 59 move out of the locks 56, 57 which remain in the position shown, while the doors open further. When the doors are closed, the locks 56, 57 are hooked into the projections 58,59 again at the last moment.

It is observed that after the foregoing, various modifications will readily occur to those skilled in the art. Thus, instead of a piston-cylinder assembly, a different type of actuator could be used, for instance an electric linear actuator. Such modifications are understood to fall within the framework of the present invention.

I claim:

1. A door system of the swivel-sliding type for use in a vehicle, suitable in particular for a vehicle for public transport, said door system comprising at least one door panel; suspension means for said at least one door panel, which comprise a telescopic guide; and a drive system for said at least one door panel, wherein the drive system comprises at least one piston-cylinder assembly of which a first movable part is connected to the telescopic guide via a system of arms and rods so as to cause said telescopic guide in operation to perform a plugging movement, while a second part of the piston-cylinder assembly is provided with a projection extending into a track having a first section extending substantially transverse to said at least one door panel and an adjoining section extending substantially parallel to the telescopic guide, the projection forming a part of a pantograph construction mounted between a fixed pivot point and a point of attachment on said door panel, said pantograph construction transmitting the movement of the projection to the door.

2. A door system as claimed in claim 1, wherein the projection is coupled to the angular point of a rod parallelogram, one side of the parallelogram that is disposed opposite said angular point being extended and pivotally connected to a fixed point, while the other side of the parallelogram that is disposed opposite said angular point is also extended and has its end extending beyond the parallelogram pivotally coupled to said at least one door panel.

3. A door system as claimed in claim 1, wherein the first movable part of the piston-cylinder assembly is coupled to an operating arm of a balance lever.

4. A door system as claimed in claim 3, wherein the first movable part is connected to the operating arm of the balance lever through a rod system comprising a lever adapted to pivot about a fixed point.

5. A door system as claimed in claim 3, wherein each end of the balance lever is coupled to an arm adapted to pivot about a fixed pivot point, the end of each pivotable arm that is remote from the balance lever being coupled to a pull/push arm which in turn is connected to the telescopic guide adjacent one end thereof.

6. A door system as claimed in claim 5, wherein the arms adapted to pivot about a fixed pivot point are bent arms.

7. A door system as claimed in claim 3, wherein the balance lever, in the closed position of the at least one door panel, can be pivoted just beyond a dead-centre position.

8. A door system as claimed in claim 1, wherein the telescopic guide is fitted with a guiding member permitting movement of the telescopic guide as a whole only in a direction transverse to the longitudinal direction of the telescopic guide.

9. A door system as claimed in claim 1, wherein the point of attachment of the pantograph construction to the at least one door panel is located on a fixed arm mounted on the door panel, which arm is further fitted with guiding means cooperating with the telescopic guide.

10. A door system as claimed in claim 1, said door system comprising two door panels adapted to be slid apart, wherein one door panel is coupled to the pantograph construction and the other door panel is coupled to said one door panel through drive means.

11. A door system as claimed in claim 10, wherein the drive means comprise an endless belt, rope or chain passed over two return wheels, said return wheels being mounted adjacent the ends of the telescopic guide, and one section of the belt, rope or chain being connected to one door panel and the other section being connected to the other door panel, so that in operation the door panels move in opposite directions.

12. A door system as claimed in claim 10, wherein each door panel is fitted with a fixed arm connected to a section of the belt, rope or chain.

13. A door system as claimed in claim 12, wherein the fixed arm of each door panel is further provided with guiding means which cooperate with the telescopic guide.

14. A door system as claimed in claim 1, wherein the drive system is arranged adjacent the top of said at least one door panel and a second balance lever is mounted adjacent the lower end of said at least one door panel, said second balance lever being coupled to said at least one door panel through a system of rods and arms, the arm coupled to the door panel being pivotally and slidably coupled to the door panel.

15. A door system as claimed in claim 14, wherein the second balance lever, in the closed position of said at least one door panel, can be pivoted just beyond a dead-centre position.

16. A door system as claimed in claim 14, wherein the second balance lever is driven by the drive system arranged at the top of said at least one door panel through a system of rods and cables.

17. A door system of the swivel-sliding type for use in a vehicle, suitable in particular for a vehicle for public transport, said door system comprising at least one door panel; suspension means for said at least one door panel, which comprise a telescopic guide; and a drive system for said at least one door panel, wherein the drive system comprises at least one piston-cylinder assembly of which a first movable part is connected to the telescopic guide via a system of arms and rods so as to cause said telescopic guide in operation to perform a plugging movement, while a second part of the piston-cylinder assembly is provided with a projection extending into a track having a first section extending substantially transverse to said at least one door panel and an adjoining section extending substantially parallel to the telescopic guide, the projection forming a part of a pantograph construction mounted between a fixed pivot point and a point of attachment on said door panel, said pantograph construction transmitting the movement of the projection to the door, the projection being coupled to the angular point of a rod parallelogram, one side of the parallelogram that is disposed opposite said angular point being extended and pivotally connected to a fixed point and the other side that is disposed opposite said angular point being likewise extended and having its end extending beyond the parallelogram pivotally coupled to said at least one door panel, and the first movable part of the piston-cylinder assembly being coupled to an operating arm of a balance lever.

18. A door system as claimed in claim 17, wherein each end of the balance lever is coupled to an arm adapted to pivot about a fixed pivot point, the end of each pivotable arm that is remote from the balance lever being coupled to a pull/push arm which in turn is connected to the telescopic guide adjacent one end thereof.

19. A door system as claimed in claim 18, wherein the arms adapted to pivot about a fixed pivot point are bent arms.

20. A door system as claimed in claim 17, wherein the balance lever, in the closed position of the at least one door panel, can be pivoted just beyond a dead-centre position.

21. A door system as claimed in claim 17, wherein the telescopic guide is fitted with a guiding member permitting movement of the telescopic guide as a whole only in a direction transverse to the longitudinal direction of the telescopic guide.

22. A door system as claimed in claim 17, wherein the point of attachment of the pantograph construction to the at least one door panel is located on a fixed arm mounted on the door panel, which arm is further fitted with guiding means cooperating with the telescopic guide.

23. A door system as claimed in claim 17, said door system comprising two door panels adapted to be slid apart, wherein one door panel is coupled to the pantograph construction and the other door panel is coupled to said one door panel through drive means.

24. A door system as claimed in claim 23, wherein the drive means comprise an endless belt, rope or chain passed over two return wheels, said return wheels being mounted adjacent the ends of the telescopic guide, and one section of the belt, rope or chain being connected to one door panel and the other section being connected to the other door panel, so that in operation the door panels move in opposite directions.

25. A door system as claimed in claim 23, wherein each door panel is fitted with a fixed arm connected to a section of the belt, rope or chain.

26. A door system as claimed in claim 25, wherein the fixed arm of each door panel is further provided with guiding means which cooperate with the telescopic guide.

27. A door system as claimed in claim 17, wherein the drive system is arranged adjacent the top of said at least one door panel and a second balance lever is mounted adjacent the lower end of said at least one door panel, said second balance lever being coupled to said at least one door panel through a system of rods and arms, the arm coupled to the door panel being pivotally and slidably coupled to the door panel.

28. A door system as claimed in claim 27, wherein the second balance lever, in the closed position of said at least one door panel, can be pivoted just beyond a dead-centre position.

29. A door system as claimed in claim 27, wherein the second balance lever is driven by the drive system arranged at the top of said at least one door panel through a system of rods and cables.

30. A door system as claimed in claim 20, wherein the telescopic guide is fitted with a guiding member permitting movement of the telescopic guide as a whole only in a direction transverse to the longitudinal direction of the telescopic guide.

31. A door system as claimed in claim 30, wherein the point of attachment of the pantograph construction to the at least one door panel is located on a fixed arm mounted on the door panel, which arm is further fitted with guiding means cooperating with the telescopic guide.

32. A door system as claimed in claim 30, said door system comprising two door panels adapted to be slid apart, wherein one door panel is coupled to the pantograph construction and the other door panel is coupled to said one door panel through drive means.

33. A door system as claimed in claim 32, wherein the drive means comprise an endless belt, rope or chain passed over two return wheels, said return wheels being mounted adjacent the ends of the telescopic guide, and one section of the belt, rope or chain being connected to one door panel and the other section being connected to the other door panel, so that in operation the door panels move in opposite directions.

34. A door system as claimed in claim 33, wherein each door panel is fitted with a fixed arm connected to a section of the belt, rope or chain.

35. A door system as claimed in claim 34, wherein the fixed arm of each door panel is further provided with guiding means which cooperate with the telescopic guide.

36. A door system as claimed in claim 30, wherein the drive system is arranged adjacent the top of said at least one door panel and a second balance lever is mounted adjacent the lower end of said at least one door panel, said second balance lever being coupled to said at least one door panel through a system of rods and arms, the arm coupled to the door panel being pivotally and slidably coupled to the door panel.

37. A door system as claimed in claim 36, wherein the second balance lever, in the closed position of said at least one door panel, can be pivoted just beyond a dead-centre position.

38. A door system as claimed in claim 36, wherein the second balance lever is driven by the drive system arranged at the top of said at least one door panel through a system of rods and cables.

* * * * *